United States Patent [19]

Dicker

[11] Patent Number: 4,866,145

[45] Date of Patent: Sep. 12, 1989

[54] CATALYST FOR GROUP TRANSFER POLYMERIZATION

[75] Inventor: Ira B. Dicker, Wilmington, Del.

[73] Assignee: E. I. Du Pont de Nemours and Company, Wilmington, Del.

[21] Appl. No.: 176,808

[22] Filed: Apr. 1, 1988

[51] Int. Cl.$^4$ ................................ C08F 4/44
[52] U.S. Cl. ................... 526/190; 526/194; 526/329.7; 526/328.5
[58] Field of Search ........... 526/190, 194, 328.5, 526/329.7

[56] References Cited

U.S. PATENT DOCUMENTS

| | | | |
|---|---|---|---|
| 3,478,007 | 11/1969 | Barkley et al. | 260/88.2 |
| 4,414,372 | 11/1983 | Farnham et al. | 526/190 |
| 4,417,034 | 11/1983 | Webster | 526/190 |
| 4,508,880 | 4/1985 | Webster | 526/190 |
| 4,524,196 | 6/1985 | Farnham et al. | 526/190 |
| 4,581,428 | 4/1986 | Farnham et al. | 526/190 |
| 4,588,795 | 5/1986 | Dicker et al. | 526/192 |
| 4,598,161 | 7/1986 | Farnham et al. | 564/101 |
| 4,605,716 | 8/1986 | Hertler | 526/190 |
| 4,622,372 | 11/1986 | Dicker | 526/190 |
| 4,656,233 | 4/1987 | Hertler et al. | 526/190 |
| 4,659,782 | 4/1987 | Spinelli | 525/293 |
| 4,659,783 | 4/1987 | Spinelli | 525/293 |
| 4,681,918 | 7/1987 | Webster | 525/282 |
| 4,695,607 | 9/1987 | Spinelli | 525/272 |
| 4,711,942 | 12/1987 | Webster | 526/185 |
| 4,732,955 | 3/1988 | Dicker | 526/194 |
| 4,736,003 | 4/1988 | Schneider | 526/194 |
| 4,771,116 | 9/1988 | Citron | 526/194 |
| 4,771,117 | 9/1988 | Citron et al. | 526/194 |

OTHER PUBLICATIONS

Webster et al., *J. Am. Chem. Soc.*, 105:5706 (1983).
Razuvaev et al., *Vysokomol. Soedin.* (*B*), 25(2), 122–125 (1983).
Sakurai et al., *Tetrahedron Lett.*, 21: 2325–2328 (1980).
Burlachenko et al., *Zhur. Obshchei Ichim.*, 43(8), 1724–1732 (1973).
Litvinova et al., abstract of *Dokl. Akad. Nauk, SSSR*, 173(3): 578–580 (1967); CA 67: 32720j.
Baukov et al., abstract of *Dokl. Akad, Nauk, SSSR*, 157(1), 119–121 (1964); CA 61: 8333f.
Satchell et al., *Qtr. Rev. Chem. Soc.*, 25: 171 (1971).
Weber, "Silicon Reagents for Organic Synthesis", New York, 1983, Chapter 3, pp. 21–39.
Noyori et al., *Tetrahedron*, 37 (23), 3899 (1981).
Toshima et al., *Kogyo Kagaku Zasshi*, 72(4), 984 (1969).

*Primary Examiner*—Joseph L. Schofer
*Assistant Examiner*—Alex H. Walker

[57] ABSTRACT

Group Transfer Polymerization wherein the catalyst consists essentially of:
(a) about 10 to 100 mol % of a silane of specific formula; and
(b) 0 to about 90 mol % of at least one of a suitable Lewis acid or mercury compound.

10 Claims, No Drawings

CATALYST FOR GROUP TRANSFER POLYMERIZATION

BACKGROUND OF THE INVENTION

1. Field of the Invention

This invention relates to Group Transfer Polymerization catalyzed by selected silanes, preferably in the presence of a suitable mercury compound and/or Lewis acid.

2. Background

U.S. Pat. Nos. 4,414,372; 4,417,034; 4,508,880; 4,524,196; 4,581,428; 4,588,795; 4,598,161; 4,605,716; 4,622,372; 4,656,233; 4,659,782; 4,659,783; 4,681,918; 4,695,607; 4,711,942; and 4,732,955; and in commonly assigned U.S. patent applications Ser. Nos. 912,117 filed Sept. 29, 1986; 934,826 filed Nov. 25, 1986; 004,831 filed Jan. 13, 1987; 007,758 filed Jan. 27, 1987; 015,727 filed Feb. 27, 1987; and 048,958 filed May 19, 1987; referred to hereinafter as "the aforesaid patents and patent applications", disclose processes for polymerizing an acrylic or maleimide monomer to a "living" polymer in the presence of:

(i) an initiator which is a tetracoordinate organosilicon, organotin or organogermanium compound having at least one initiating site; and (ii) a co-catalyst which is a source of fluoride, bifluoride, cyanide or azide ions or a suitable Lewis acid, Lewis base or selected oxyanion. Such polymerization processes have become known in the art as Group Transfer Polymerization (Webster et al., *J. Am. Chem. Soc.*, 105: 5706 (1983)).

Preferred monomers for use in Group Transfer Polymerization are selected from acrylic and maleimide monomers of the formula $CH_2=C(Y)X$ and

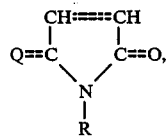

and mixtures thereof, wherein:

X is $-CN$, $CH=CHC(O)X'$ or $-C(O)X'$;

Y is $-H$, $-CH_3$, $-CN$ or $-CO_2R$, provided, however, when X is $-CH=CHC(O)X'$, Y is $-H$ or $-CH_3$;

X' is $-OSi(R^1)_3$, $-R$, $-OR$ or $-NR'R''$;

each $R^1$, independently, is a hydrocarbyl radical which is an aliphatic, alicyclic, aromatic or mixed aliphatic-aromatic radical containing up to 20 carbon atoms or $-H$, provided that at least one R group is not $-H$;

R is:

(a) a hydrocarbyl radical which is an aliphatic, alicyclic, aromatic or mixed aliphatic-aromatic radical containing up to 20 carbon atoms;

(b) a polymeric radical containing at least 20 carbon atoms;

(c) a radical of (a) or (b) containing one or more ether oxygen atoms within aliphatic segments thereof;

(d) a radical of (a), (b) or (c) containing one or more functional substituents that are unreactive under polymerizing conditions; or (e) a radical of (a), (b), (c) or (d) containing one or more reactive substituents of the formula $-Z'-(O)C-C(Y^1)=CH_2$ wherein $Y^1$ is $-H$ or $-CH_3$ and $Z'$ is O or NR' wherein R is as defined below; and each of R' and R'' is independently selected from $C_{1-4}$ alkyl.

Preferred initiators are selected from tetracoordinate organosilicon, organotin and organogermanium compounds of the formulas $(Q')_3MZ$, $(Q')_2M(Z^1)_2$ and $[Z^1(Q')_2M]_2O$ wherein:

each Q', independently, is $R^1$, $OR^1$, $SR^1$ or $N(R^1)_2$;

$R^1$ is as defined above for the monomer;

Z is an activating substituent selected from the group consisting of

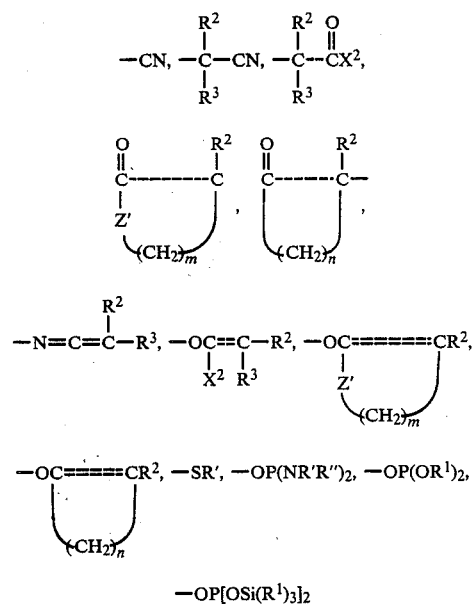

and mixtures thereof;

R', R'', R and R are as defined above for the monomer;

$Z^1$ is

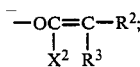

$X^2$ is $-OSi(R^1)_3$, $-R^6$, $-OR^6$ or $NR'R''$;

$R^6$ is (a) a hydrocarbyl radical which is an aliphatic, alicyclic, aromatic or mixed aliphatic-aromatic radical containing up to 20 carbon atoms;

(b) a polymeric radical containing at least 20 carbon atoms;

(c) a radical of (a) or (b) containing one or more ether oxygen atoms within aliphatic segments thereof;

(d) a radical of (a), (b) or (c) containing one or more functional substituents that are unreactive under polymerizing conditions; or (e) a radical of (a), (b), (c) or (d) containing one or more initiating sites; and each of $R^2$ and $R^3$ is independently selected from $-H$ and hydrocarbyl, defined as for $R^6$ above, subparagraphs (a) to (e);

R', R" and $R^1$ are as defined above for the monomer;
Z' is as defined above for the monomer;
m is 2, 3 or 4;
n is 3, 4 or 5;
$R^2$ and $R^3$ taken together are

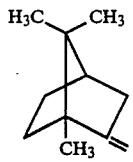

provided Z is

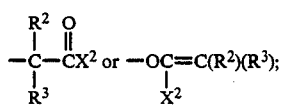

$X^2$ and either $R^2$ or $R^3$ taken together are

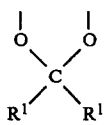

provided Z is

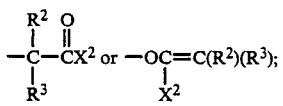

and

M is Si, Sn, or Ge, provided, however, when Z is

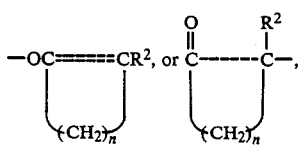

M is Sn or Ge.

Preferred co-catalysts are selected from a source of bifluoride ions $HF_2^-$, or a source of fluoride, cyanide or azide ions, or a source of oxyanions, said oxyanions being capable of forming a conjugate acid having a pKa (DMSO) of about 5 to about 24, preferably about 6 to about 21, more preferably 8 to 18, or a suitable Lewis acid, for example, zinc chloride, bromide or iodide, boron trifluoride, an alkylaluminum oxide or an alkylaluminum chloride, or a selected Lewis base.

Additional details regarding Group Transfer Polymerization can be obtained from the aforesaid patents and patent applications, the disclosures of which are hereby incorporated by reference.

Razuvaev et al., *Vysokomol.Soedin.(B)*, 25(2):122-125 (1983) disclose polymerization of methyl methacrylate and/or styrene initiated by a mixture of silicon tetrachloride and alkyls of mercury, tin or lead, at 20°-50° C. Sakurai et al., *Tetrahedron Lett.*, 21:2325-2328 (1980) disclose mercuric iodide catalyzed isomerization of (trimethylsilylmethyl)chloromethyl ketone to (1-chloromethyl ethenyl)oxytrimethylsilane.

Burlachenko et al., *Zhur, Obshchei Khim.*, 43(8):1724-1732 (1973) disclose isomerization of cis-ketene silyl acetals into the trans-isomer catalyzed by triethylsilyl bromide and mercuric bromide. Litvinova et al., abstract of *Dokl. Akad. Nauk. SSSR*, 173(3):578-580 (1967); CA 67: 32720j, disclose the mercuric iodide-catalyzed rearrangement of triethylacetonylsilane to (isopropenyloxy)triethylsilane.

Baukov et al., abstract of *Dokl. Akad. Nauk. SSSR*, 157(1):119-121 (1964); CA 61: 8333f, disclose the mercuric iodide-catalyzed rearrangement of [(1-methoxy-1-ethenyl)oxy]triethylsilane to methyl 2-triethylsilylacetate.

Satchell et al., *Qtr. Rev. Chem Soc.*, 25:171 (1971) disclose that mercuric halides are very weakly acidic Lewis acids.

Weber, "Silicon Reagents for Organic Synthesis", New York, 1983, Chapter 3, pp 21-39 describes preparation and reactions of trimethylsilyl iodide, bromide and trifluoromethanesulfonate (triflate). These reagents are used as catalysts for cleaving chemical bonds in organic compounds and as silylating agents. They are often used in conjunction with organic bases such as pyridine. A more extensive survey of reactions catalyzed by trimethylsilyl triflate and trimethylsilyl esters of "Nafion" perfluorsulfonic acid resin is provided by Noyori et al., Tetrahedron, 37 (23), 3899 (1981).

U.S. Pat. No. 3,478,007 discloses polymerization of unsaturated cyclic hydrocarbons using aluminum chloride and a trialkylsilicon halide as catalyst; $AlCl_3$ and trimethylsilyl chloride are exemplified.

Toshima et al., Kogyo Kagaku Zasshi 72(4), 984 (1969) discloses polymerization of styrene catalyzed by trimethylsilyl chloride and mercuric chloride.

The above publications do not suggest the use of trialkylsilyl halides with or without added Lewis acids or mercuric compounds as catalysts for Group Transfer polymerization.

U.S. Pat. No. 4,732,955, supra, discloses Group Transfer Polymerization of one or more acrylate or acrylamide monomers in the presence of a mercury compound of the formula $R^7HgI$, wherein $R^7$ is a $C_{1-10}$ hydrocarbyl radical, or $HgL_2$, wherein L is I or $ClO_4$. Commonly assigned U.S. patent application Ser. No. 176,807 concurrently filed herewith discloses the use of these mercury compounds, and also Lewis acid/silane mixtures, as catalysts in the preparation of 1:1 adducts of silyl ketene acetals and $\alpha,\beta$-unsaturated compounds, the adducts being effective GTP initiators.

Commonly assigned U.S. patent application Ser. No. 015,727, supra, discloses Group Transfer Polymerization in the presence of a non-initiating silylated ester or ether, preferably trimethylsilyl 3-chlorobenzoate, said ester or ether serving as a "livingness" enhancing agent.

The present invention provides an improved Group Transfer Polymerization process wherein the catalyst is a selected non-polymerization-initiating silane or a mixture thereof with a suitable mercury compound and/or Lewis acid. Mercury compounds disclosed herein are also disclosed for another use in the commonly assigned application filed herewith under Docket No. CR-8417, supra.

SUMMARY OF THE INVENTION

The present invention resides in a Group Transfer Polymerization (GTP) process comprising contacting under polymerizing conditions at least one monomer selected from acrylic and maleimide monomers with (i) a tetracoordinate organosilicon, -tin or -germanium compound having at least one initiating site, and (ii) a catalyst which is a suitable Lewis acid or mercury compound, the process further characterized in that the catalyst consists essentially of:

(a) about 10 to 100 mol % of a silane of the formula $(R^1)_3Si-Z^3$ wherein:

each $R^1$, independently, is a hydrocarbyl radical which is an aliphatic, alicyclic, aromatic or mixed aliphatic-aromatic radical containing up to 20 carbon atoms or —H, provided that at least one $R^1$ group is not —H; and $Z^2$ is a weakly basic radical, for example, I, Br, Cl, $CF_3SO_3$, $CF_3CO_2$, $ClO_4$ or $SO_4$; and (b) 0 to about 90 mol % of at least one of a suitable Lewis acid or mercury compound, provided, however, when $Z^3$ is other than I, at least 0.5 mole % of suitable Lewis acid or mercury compound selected from $R^7HgI$, $HgI_2$ and $Hg(ClO_2)_4$ is present.

DETAILED DESCRIPTION OF THE INVENTION

Suitable Lewis acids for use in the process of the invention include zinc iodide, chloride or bromide, boron trifluoride, an alkylaluminum oxide, an alkylaluminum chloride, cadmium iodide, ferric chloride, and stannous chloride.

Suitable mercury compounds include the common mercuric compounds, preferably those of the formula $R^7HgI$ and $HgL_2$ wherein:

$R^7$ is a hydrocarbyl radical having 1 to 10 carbon atoms; and

L is I, Br, Cl, $CF_3CO_2$, $ClO_4$, $SO_4$, trifluoromethane sulfonate (triflate) or O. Preferably, L is iodide or bromide, most preferably iodide.

The Lewis acid or mercury compound, when present in the catalyst composition of the invention, may be supported on an inert insoluble support, such as carbon.

The process of the invention may be carried out with or without a solvent. Suitable solvents are generally those disclosed in the aforesaid patents and patent applications, non-coordinating liquids such as hydrocarbons or chlorinated hydrocarbons being preferred when mercury compounds are present in the catalyst composition. Preferred acrylic monomers and initiators disclosed in the aforesaid patents and patent applications are also preferred in the process; see especially U.S. Pat. Nos. 4,508,880 and 4,732,955 and application Ser. No. 004,831, supra. Acrylates and N,N-dialkylacrylamides are most preferred monomers for the process of this invention.

Process conditions such as temperature, pressure, concentrations of starting materials, monomer to initiator ratio, catalyst to initiator ratio, and precautions against moisture and other hydroxylated impurities are also as described in the aforesaid patents and patent applications. Supplemental details are provided below The amount of catalyst composition used in the process of the invention should be at least about 0.01 mole per mole of starting initiator, preferably about 0.05 to about 10 moles per mole of starting initiator, although amounts as high as about 100 moles per mole of initiator can be tolerated.

Preferred catalyst compositions are those containing from about 0.5 mole % to about 80 mole % of a mercury compound or Lewis acid as previously defined. Catalyst compositions wherein at least one component is an iodide are most preferred.

It will be understood that some, but not all, of the components of the catalyst composition of the invention are themselves catalysts for GTP. Components which catalyze GTP include the aforesaid silane, the Lewis acids recited above except cadmium iodide, ferric chloride and stannous chloride, and mercury compounds of the formula $R^3HgI$ and HgL: wherein $R^7$ is as defined above and L is I or $ClO_4$. However, as can be seen from the ensuing experiments and examples, the catalyst compositions which contain both the silane and the mercury compound or the Lewis acid are, surprisingly, more active than the individual components, especially at low temperatures. Example 21 shows that a composition of the invention is an active catalyst for the polymerization of ethyl acrylate by GTP at −78° C., although the catalyst components individually are inoperable. This unexpected catalytic synergism found in the present catalyst mixtures is especially useful when it is desired to minimize the amount of mercury or Lewis acid employed in the polymerization process. The present preferred compositions are also more effective catalysts for the polymerization of (meth)acrylates than are the individual components, especially mercury compounds which, alone, are essentially inactive for polymerizing these monomers.

In the following examples of the invention, weight and number average molecular weights of the polymer products ($\overline{M}_w$, $\overline{M}_n$) were measured by gel permeation chromatography (GPC). The polydispersity of the polymer is defined by $D=\overline{M}_w/\overline{M}_n$. Unless otherwise specified, the "living" polymer products were quenched by exposure to moist air or methanol before molecular weights were determined. Parts and percentages are by weight and temperatures are in degrees Celsius unless otherwise specified.

In several instances catalyst activity is measured by the elapsed time prior to the onset of exothermic polymerization, shorter induction periods representing higher activity. When catalytic activity is weak, polymer may be formed without detectable temperature rise.

Preferred embodiments of the present invention are represented by Examples 3, 5, 6, 8 and 21.

EXAMPLE 1

To a dry 100-mL round bottom (RB) flask were added 20 mL of toluene, 0.40 mL of [(1-methoxy-2-methyl-1-propenyl)oxy]trimethylsilane (MTS) (2.0 mmoles) and 40 μL of iodotrimethylsilane (TMSI, 0.28 mmole). To the mixture stirred under argon was added 5 mL of ethyl acrylate (46 mmoles) No exotherm was observed. After about two h 0.66 mL of 0.003M mercuric iodide solution in benzene (d6) (0.002 mmole) was added. The temperature rose, indicating polymerization. An aliquot was withdrawn (A). Another 3 mL of ethyl acrylate was added and, after polymerization, an aliquot was withdrawn (B). This procedure was twice repeated, providing aliquots C and D. Poly(ethyl acrylate) was recovered from each aliquot:

| GPC: | Aliquot | Mn | Mn (theory) | D |
|---|---|---|---|---|
| | A | 2580 | 2400 | 1.18 |
| | B | 4250 | 3800 | 1.26 |
| | C | 5920 | 5200 | 1.49 |

-continued

| GPC: | Aliquot | Mn | Mn (theory) | D |
|---|---|---|---|---|
| | D | 8480 | 6560 | 1.78 |

EXAMPLE 2

A. Example 1 was repeated using 0.009 mmole of mercuric iodide and, initially, no TMSI. Temperature rise, indicating polymerization, occurred after about 45 min.

B. The experiment of Part A was repeated except that 2.0 mmoles of TMSI was also added. Exothermic polymerization occurred within 1 minute, indicating more efficient catalysis.

EXAMPLE 3

To a dry 100-mL RB flask were added 20 mL of toluene, 1.0 mL of 0.003M mercuric iodide solution in benzene (0.003 mmole), 2.0 mL of [(1-[2-trimethylsiloxyethoxy-2-methyl-1-propenyl)oxy]trimethylsilane (TTEB) and 44 µL of TMSI (0.31 mmole). To this solution was added 10 mL of ethyl acrylate (92 mmoles). Exothermic polymerization occurred. After polymerization appeared complete, 0.52 mL of 1,3-dioxolane was added to cap the "living" polymer. A quantitative yield of poly(ethyl acrylate) (PEA) was obtained. GPC: $\overline{M}n$ 1910; $\overline{M}n$ (theory) 1700; D 1.16. Hydrolysis of the end-groups in refluxing THF/water/HCl gave the PEA diol with 100% difunctionality by NMR.

EXAMPLE 4

A. To a dry 100-ml RB flask were added 0.2 g of zinc iodide (0.6 mmole), 20 mL of toluene, 1.97 mL of TTEB (6.2 mmole) and 44 µL of TMSI (0.31 mmole). To this mixture was added 10 mL of ethyl acrylate over 11 minutes. The mixture temperature rose rapidly during monomer addition and an ice bath was used to keep the temperature below 31°. The polymer was quenched with 1,3-dioxolane and stripped to give a quantitative yield of PEA. GPC: $\overline{M}n$ 1800; $\overline{M}n$ (theory) 1700; D 1.19.

B. The experiment of Part A was repeated except that no TMSI was added. Polymerization occurred after an induction period of 17 min. The recovered polymer had a bimodal molecular weight distribution, indicating poor molecular weight control. GPC $\overline{M}n$ 1120; $\overline{M}n$ (theory) 1700; D 1.49.

EXAMPLE 5

To a 100-mL RB flask was added 0.05 g of zinc iodide (0.16 mmole), 20 mL of toluene, 0.32 mL of TTEB (1.0 mmole) and 15 mL of ethyl acrylate. No polymerization was observed After 1.25 h, 10 µL of TMSI were added. Exothermic polymerization occurred, requiring external cooling. A quantitative yield of PEA was obtained. GPC: $\overline{M}n$ 20,200; $\overline{M}n$ (theory) 19,000; D 1.25.

EXAMPLE 6

To a 100-mL flask containing 0.035 g of zinc bromide (0.16 mmole), 20 mL of toluene and 0.32 mL of TTEB (1.0 mmole) was added 11 mL of ethyl acrylate. No exotherm was observed. To the mixture was then added 0.26 mL of bromotrimethylsilane. Rapid temperature rise was observed, and a quantitative yield of PEA was obtained. GPC: $\overline{M}n$ 15,000; $\overline{M}n$ (theory) 10,300; D 1.24.

EXAMPLE 7

To a 100-mL flask containing 0.1 g of mercuric iodide (0.22 mmole), 20 mL of toluene, 0.64 mL of TTEB (2.0 mmoles) and 0.1 mL of TMSI (0.7 mmole) was added 10 mL of methyl methacrylate (MMA) No exotherm was observed. An additional 0.3 mL of TMSI was added (total 2.8 mmoles). Exothermic polymerization occurred. A 91% yield of PMMA was obtained. GPC: $\overline{M}n$ 3310; $\overline{M}n$ (theory) 4800; D 1.07.

EXAMPLES 8–20

General procedure: To a dry 50-mL bottle with a septum, under argon, were added 3 mL of toluene, 0.4 mL of MTS (2.0 mmole), 3 mL of ethyl acrylate (0.028 mole) and 2.0 mmole of silane; after 15 min, during which no polymerization was detected, 0.20 mmole of a selected Lewis acid was added, except in Examples 8 and 13. The bottle was hand-shaken and checked periodically for exothermic polymerization. The results are summarized in Table 1.

EXPERIMENTS 1–5

The procedure of Examples 8–20 was followed except that the silane was omitted, and the Lewis acid was added to the initiator and solvent before monomer addition; these experiments, not of the invention, serve as controls for Examples 9, 14, 17, 18 and 20, respectively. The results are given in Table 1.

TABLE 1

| Example | Silane | Lewis Acid | Exo (min)* | Mn/D |
|---|---|---|---|---|
| 8 | TMSI | none | (a) | 1200/1.17 |
| 9 | TMSI | ZnI$_2$ | <1 | 849/1.21 |
| 10 | TMSBr | ZnI$_2$ | 3 | NA |
| 11 | TMSCl | ZnI$_2$ | 8 | NA |
| 12 | TMSTf | ZnI$_2$ | 1–2 | 712/1.30 |
| 13 | TMSTf | none | (a) | 1030/1.30 |
| 14 | TMSI | ZnBr$_2$ | 4 | 859/1.58 |
| 15 | TMSBr | ZnBr$_2$ | 9 | NA |
| 16 | TMSCl | ZnBr$_2$ | 10 | NA |
| 17 | TMSI | SnCl$_4$ | 20 | 1320/1.20 |
| 18 | TMSI | CdI$_2$ | <1 | 1370/1.30 |
| 19 | TMSBr | CdI$_2$ | (a) | 1090/1.10 |
| 20 | TMSI | FeCl$_3$ | 40 | 7980/2.7 |
| Experiment | | | | |
| 1 | | ZnI$_2$ | 15 | 931/1.35 |
| 2 | | ZnBr$_2$ | 18 | 870/1.58 |
| 3 | | SnCl$_4$ | none | no polymer |
| 4 | | CdI$_2$ | none | no polymer |
| 5 | | FeCl$_3$ | none | no polymer |

TMS = trimethylsilyl; Tf = triflate; NA = not available;
*exo (min) is the time (minutes) before an exothermic temperature rise was observed.
(a) = no exotherm was observed; polymer formed slowly overnight;
"none" means no exotherm and no polymerization.

EXAMPLE 21

Separate experiments have shown that acrylates are not polymerized by GTP at −78° in the presence of a mercury compound or silane alone.

To a 100-mL round bottom flask were added 20 mL of toluene, 0.40 mL of MTS (2.0 mmoles), 0.66 mL of 0.003M mercuric iodide solution in benzene, and 10 mL of ethyl acrylate. The solution was cooled to −78° and 40 µL of TMSI (0.28 mmole) was added. After 69 min, an aliquot was withdrawn for GPC analysis (A). At that time, an additional 40 µL of TMSI (0.28 mmole) was added. A slight exotherm was observed; the mixture was allowed to stir for 33 min, then quenched with 1 mL of methanol After warming to room temperature, a quantitative yield of PEA was obtained (B). GPC: (A)

$\overline{Mn}$ 2510; D 1.21; (B) $\overline{Mn}$ 4190; D 1.08. The molecular weight of sample A indicates that about 60% of the monomer had been consumed before the second addition of TMSI.

EXAMPLE 22

To a dry 50-mL bottle fitted with a septum, under argon, were added 3 mL of toluene, ethyl acrylate (0.019 mole), MTS (2.0 mmoles), and mercuric chloride (0.022 mmole) supported on carbon (12% HgCl,). No polymerization occured. TMSI (0.14 mmole) was then added, whereupon exothermic temperature rise occurred within seconds, accompanied by rapid viscosity rise, confirming polymerization.

I claim:

1. In a Group Transfer Polymerization (GTP) process comprising contacting under polymerizing conditions at least one monomer selected from acrylic and maleimide monomers with (i) a tetracoordinate organosilicon, -tin or -germanium compound having at least one initiating site, and (ii) a catalyst which is a suitable Lewis acid or mercury compound, the process further characterized in that the catalyst consists essentially of:
   (a) about 10 to 100 mol % of a silane of the formula $(R^1)_3Si-Z^2$ wherein:
      each $R^1$, independently, is a hydrocarbyl radical which is an aliphatic, alicyclic, aromatic or mixed aliphatic-aromatic radical containing up to 20 carbon atoms or —H, provided that at least one $R^1$ group is not —H; and
      $Z^2$ is a weakly basic radical selected from I, Br, Cl, $CF_3SO_3$, $CF_3CO_2$, $ClO_4$ and $SO_4$; and
   (b) 0 to about 90 mol % of at least one of a suitable Lewis acid or mercury compound, provided, however, when $Z^2$ is other than I, at least 0.5 mole % of suitable Lewis acid or mercury compound selected from $R^7HgI_2$ and $Hg(ClO_4)_2$ is present, wherein $R^7$ is a hydrocarbyl radical having 1 to 10 carbon atoms.

2. Process of claim 1 wherein the amount of catalyst is at least about 0.01 mole per mole of initiator.

3. Process of claim 1 wherein the amount of catalyst is about 0.05–10 moles per mole of initiator.

4. Process of claim 1 wherein the catalyst consists of about 10–99.5 mole % of (a) and about 0.5–90 mole % of (b), the mixture of (a) and (b) totaling 100%.

5. Process of claim 4 wherein at least one component of the mixture is an iodide.

6. Process of claim 4 wherein the catalyst components are iodotrimethylsilane and mercuric iodidie.

7. Process of claim 4 wherein the catalyst components are iodotrimethylsilane and zinc iodide.

8. Process of claim 4 wherein the catalyst components are bromotrimethylsilane and zinc bromide.

9. Process of claim 4 wherein the catalyst components are chlorotrimethylsilane and zinc iodide.

10. Process of claim 1 wherein the catalyst components are iodotrimethylsilane.

* * * * *